(12) United States Patent
Van Der Berg

(10) Patent No.: US 10,915,978 B2
(45) Date of Patent: Feb. 9, 2021

(54) INTEGRATED RIDE SHARING SYSTEM AND METHOD FOR FLEET MANAGEMENT SYSTEMS

(71) Applicant: Ilan Van Der Berg, Netanya (IL)

(72) Inventor: Ilan Van Der Berg, Netanya (IL)

( * ) Notice: Subject to any disclaimer, the term of this patent is extended or adjusted under 35 U.S.C. 154(b) by 155 days.

(21) Appl. No.: 15/311,140

(22) PCT Filed: May 14, 2015

(86) PCT No.: PCT/IL2015/050520
§ 371 (c)(1),
(2) Date: Nov. 14, 2016

(87) PCT Pub. No.: WO2015/173829
PCT Pub. Date: Nov. 19, 2015

(65) Prior Publication Data
US 2017/0091891 A1    Mar. 30, 2017

Related U.S. Application Data

(60) Provisional application No. 61/993,080, filed on May 14, 2014, provisional application No. 62/053,230, filed on Sep. 22, 2014.

(51) Int. Cl.
| | |
|---|---|
| *G06Q 50/30* | (2012.01) |
| *G07B 15/00* | (2011.01) |
| *G08G 1/00* | (2006.01) |
| *G07B 15/02* | (2011.01) |
| *G06Q 10/06* | (2012.01) |
| *G08G 1/127* | (2006.01) |
| *G07B 13/00* | (2006.01) |
| *G06Q 50/18* | (2012.01) |

(52) U.S. Cl.
CPC ............ *G06Q 50/30* (2013.01); *G06Q 10/06* (2013.01); *G06Q 10/06315* (2013.01);
(Continued)

(58) Field of Classification Search
CPC ............ G06Q 50/30; G06Q 10/06315; G06Q 50/188; G06Q 10/06; G08G 1/202; G08G 1/127; G07B 15/00; G07B 15/02
(Continued)

(56) References Cited

U.S. PATENT DOCUMENTS 8,315,792 B2 * 11/2012 Speier .................... G01C 21/00
701/400
9,638,538 B2 * 5/2017 Otero Diaz ........ G01C 21/3667
(Continued)

FOREIGN PATENT DOCUMENTS

FR      2880975       7/2006
WO   WO 2013/175418   11/2013

*Primary Examiner* — Igor N Borissov
(74) *Attorney, Agent, or Firm* — Di Nola IP; Liliana Nola-Baron

(57) ABSTRACT

An integrated transportation system (TIS) that comprises at least one Fleet Management System (FMS), Ride Sharing (RS) module and Administrator of the TIS that is configured to supervise and mediate communication between the FMS and RS module upon uploading transportation service offers through the RS module to potential passengers and cargo. The TIS comprises functionalities that enable establishing FMS on the TIS, enabling the FMS to offer transportation service offers to TIS users through the RS module, receiving requests for such services through the RS module and supervising their execution. The TIS also maintains a database relating to transportation services carried out through it and offers access to such database to interested parties.

34 Claims, 13 Drawing Sheets

(52) U.S. Cl.
CPC .......... *G06Q 50/188* (2013.01); *G07B 13/00* (2013.01); *G07B 15/00* (2013.01); *G07B 15/02* (2013.01); *G08G 1/127* (2013.01); *G08G 1/202* (2013.01)

(58) Field of Classification Search
USPC .................................................... 705/13, 80
See application file for complete search history.

(56) References Cited

U.S. PATENT DOCUMENTS

| | | | |
|---|---|---|---|
| 2004/0073440 A1 | 4/2004 | Garbers et al. | |
| 2004/0078335 A1* | 4/2004 | Calvesio ............... | G06Q 10/02 705/50 |
| 2008/0228533 A1* | 9/2008 | McGuire ............... | G06Q 10/02 705/5 |
| 2009/0248587 A1* | 10/2009 | Van Buskirk .......... | G06Q 10/06 705/80 |
| 2014/0089061 A1* | 3/2014 | Vitale ................ | G06Q 20/3274 705/7.41 |
| 2015/0348221 A1* | 12/2015 | Pedersen ............... | G06Q 50/30 705/7.38 |
| 2015/0363986 A1* | 12/2015 | Hoyos ................ | G07C 9/00563 340/5.61 |
| 2016/0042321 A1* | 2/2016 | Held ................ | G06Q 10/08355 705/338 |
| 2016/0232627 A1* | 8/2016 | Smith ................ | G06Q 30/0611 |

\* cited by examiner

INTEGRATED RIDE SHARING SYSTEM AND METHOD FOR FLEET MANAGEMENT SYSTEMS

FIELD OF THE INVENTION

The present invention pertains to fleet management and ride sharing. In particular, the present invention pertains to free access system combining fleet management and ride sharing services for vehicle fleet administrators responding to ride sharing requests and routing and distributing these requests to their vehicles.

BACKGROUND

Today fleet management is carried out on customized platforms, designed particularly for the need of the particular fleet administrators and cost considerably. Additionally, applications for ride sharing are suitable only for driver-passenger communication and do not provide control means for fleet administrators.

In order for a ride sharing system and fleet management system to communicate with each other or work together, there should be a system that combines the two systems and at the same time filters considerable information. This system should also communicate with other supporting or supplementing systems. Currently, there is no system that integrates between the fleet management and ride sharing systems. The option for connecting between these two systems is with a complex system that is capable of accessing and reading the database of a fleet management system and also knowing what information can be selectively provided to the users of the ride sharing system (not all of the information of the fleet management system can be shared with external sources). This complex system should also cross-update the fleet management and ride sharing systems after each action done in each of the systems. Additionally, there should also be a bi- or even tri-directional communication system between the fleet management and ride sharing system to enable communication between users.

A fleet management administrator with a fleet with 10 vehicles allocates a certain vehicle for a ride from X to Y, while driving from A to Z. In order for the fleet administrator to distinguish between the allocated vehicle and all other vehicles, he should use the ride sharing system for advertising the ride in the ride sharing proposition but exclude certain details about his fleet company that he does not wish to make public on the shared network. Therefore, the administrator should constantly cross-update his fleet management system and the ride sharing system. Otherwise, it will not be possible to operate these two systems in concert without a third system that combines them together. A second more potentially worthwhile option is a single system that integrates the two systems, i.e. fleet management and ride sharing.

To this day, passengers are accustomed to drive with their private cars, public transportation, private taxi and other "conventional" transportation means. The public also got used to novel technologies such as computer systems, smartphones and social networks. Accordingly, there is a need for effective transportation to minimize overload in the roads and fuel combustion products release to the surrounding. The system of the present invention changes the thinking and behavior patterns regarding public transportation and its use, e.g. taxis, offering each private car to essentially operate as a taxi, which will also release overload.

The current fleet management systems do not allow making search for occasional ride. These systems manage a very large database of fleet vehicles but lack communication with potential passengers for receiving their approval and between a system and drivers. they also lack functionalities for sharing transportation between potential passengers and the fleet company.

U.S. Pat. No. 7,627,422 offers an option for the potential occasional passenger to contact a driver (that happens to belong to the company but not related to the company's system of fleet management) through a known smartphone communication system. This is the same as any driver can receive a direct request from an occasional passenger. However, the driver cannot negotiate travels directly with passengers without company approval and payment to the company. Of course, the driver does not always know on the work programs that the company generates for its particular vehicles and drivers.

U.S. Pat. No. 7,627,422 lacks communication with the administrator of the transportation/traveling company. Rather only indirect communication with the driver is suggested, and this cannot establish contact with the potential passenger without being notified on the approval of the company owner. At best, U.S. Pat. No. 7,627,422 offers a solution for company owner with a single vehicle. Regarding communication, in U.S. Pat. No. 7,627,422, the communication system is the driver's not the vehicle or the company. This is unlike the system of the present invention as detailed later, where the communication system is, in principle, built inside the fleet vehicles. This system synchronizes with the driver smartphone.

In conclusion, U.S. Pat. No. 7,627,422 does not offer a combination of a regular fleet company or fleet management systems with a ride sharing system.

The following example illustrates the difficulties in managing two separate systems of fleet management and ride sharing:

A transportation company owns a vehicle driving from A to Z: first from A to B at 8:30 AM, then from B to Y at approximately 9:30 AM and finally from Y to Z. The passengers change between points of pick up and drop off. The driver is a particular one, e.g. Stan until Z, and then replaced by another, Josh. The vehicle makes the back trip to B and then to A. The company desires to advertise the trip to occasional passengers. For this, the company needs to access a different system, i.e. ride sharing, and advertise the details of the available trip, pick up and drop off point, approximate time of departure and arrival, fees, type of vehicle, route, intermediate pick up/drop off points etc.

Coordinating between Separate Systems of Fleet Management and Ride Sharing—The data available for the trip are as follows: 50 seats are available from B to Y at 9:30 AM. The driver is Stan, Car number is 33, car details are also provided. A passenger desires a trip from B to G. For this, the fleet company administrator needs to access the fleet management system to inquire on the trip fees, then return to/access the ride sharing system to provide the fee for the interested passenger. In case of agreement for the trip, the administrator needs to update the fleet management system and of course the driver on the trip, type of vehicle etc. In case of car breaking down, the administrator needs to supply a replacement car and manually update the two systems, fleet management and ride sharing. This is due to lack of a system that combines or integrates these two systems.

Therefore, in case of passenger(s) update or change, the company administrator needs to manually update the fleet management system based on the changes registered in the ride sharing system. It follows, that separation of the two systems from each other entails separate, complicated and cumbersome management and manual update of data.

Only a system that combines these two systems, which are completely different from each other, enables operating them together and also providing automatic, simultaneous update.

The above shortcomings of separate systems and advantages of an integrated system, applies also to accessing official systems for informing on relevant details, updating vehicles registry and fleet companies business operation and communicating with passengers.

In view of the above, the following two examples reflect the advantages of the system of the present invention:

Currently, a user searching for a cost effective transportation solution should contact several companies for the best result. However, the system of the present invention provides the best solution for any particular user at any given time relying on a global and updated transportation database.

For aerial transportation, there are systems that locate the most cost effective flight for a user, but connect only between passengers and a particular airline company. There is no cooperation between airline companies that minimizes situation of only half or partially full flights due to lack of coordination between companies regarding capacity and occupancy. Further, current systems refer only to airplanes and do not monitor and collect data in a single database to meet with users needs. Therefore, in the current systems, potential passengers cannot communicate directly with the airline company and surely not with the plane.

Objectives

Integrated Systems—The present invention aims at avoiding the complex operation of two systems, i.e. fleet management and ride sharing, completely distinguished from each other. To avoid such complex operation, the present invention provides a single integrated system that provides functionalities of both fleet management and ride sharing.

Further, the system of the present invention enables cooperating/sharing between different transportation companies, and between fleet management systems.

One particular object of the present invention is that the combined system allows passengers to form a traveling group for a particular trip or search for such group.

In another particular object, external systems for different functions, e.g. billings, calculation of traveling, communication, social networks etc., are also connected to the combined system and synchronize with it.

Further object is to provide passengers with a feedback channel, enabling them to rate quality service of transportation service companies and share it with future passengers.

This and other objects and embodiments of the present invention shall become apparent as the description proceeds.

SUMMARY

In one aspect, the present invention provides Transportation Integrated System (TIS) combining fleet management and ride sharing functionalities on a single platform. The TIS enables direct communication between fleet management system and ride sharing module, supervised and controlled by the TIS administrator, thus facilitating easier and faster communication between them, while at the same time increasing the number of options available to a user. The TIS platform also provides inter-connection and communication functionalities that render ride sharing more profitable to fleet companies, thereby increasing their incentive to upload their entire operation to the TIS. Further, the TIS also provides free access, generation and registration of Fleet Management Systems (FMSs) for every individual or group of individuals who wish to offer their ride sharing services. Communication between different participants is made easier with the TIS, enabling creation of joint operations between fleet companies and passengers.

Since the TIS is global, geographic location or type of transportation are not a factor in managing fleet company operation on it. Therefore, trans-continental, trans-country and cross-country multi-segmented trips may be easily produced and offered to passengers, without having to arrange for a ride at each point of arrival. The same applies to cargo shipping, since the only difference is the type of item, passenger or cargo, which is delivered.

Fee collection and Payment distribution are better supervised by the TIS and more transparent to all participants, therefore rendering the planning and executing of rides more credible and reliable. Accordingly, the TIS provides more efficient transaction for every ride and monitor it while providing every party involved access to ride itself and payment process carried out.

Due to the potentially large volume of traffic through the TIS, a database may be generated that stores valuable information on rides and secondary data relating to it in some way. Users of the TIS may then use the accumulated information for transportation-related, commercial, research and private purposes. The database generated at the TIS may also communicate with external databases for improving traffic through it and services to passengers and fleet companies alike.

Types of System Users

Users of transportation that the system is made available to can be of any type and in particular any or all of the following:

Cargo companies.

Shipping companies.

Private and public bus companies.

Public and private transportation companies.

Companies maintaining field workers, salesmen, service personnel, workers provided with transportation to, from and during work.

Companies maintaining field workers for different tasks using company dedicated service vehicles.

Cab drivers, car service drivers.

Cooperative companies with a plurality of users sharing several vehicles.

Private and public marine vehicles for cargo shipping and people transportation.

Rental marine vehicles.

Aerial vehicles for cargo and people.

Rental and leasing aerial vehicles.

Other transportation means related or customized user companies.

Industries and factories requiring distribution lines of their goods.

Industries and factories managing distribution fleet of vehicles for their goods.

Courier companies for post office and packages.

Logistic companies.

Individuals owning private vehicles, which they lend for ride sharing and cargo shipping.

System Income Flow/Revenues

The following lists several of the income channels made available by the system of the present invention:

The present invention generates direct income from the free access system (current fleet management systems are purchased and/or require user fees payment disregarding the savings they produce to users and direct or indirect income they produce).

Supplemental/additional income is produced for the administrator of the combined system from combining all factors involved and providing further tools for anyone connected to it, e.g. data retrieval, information search. For example, insurance companies pay for updated information and offering discount since the system enables easier identification and locating of car theft through GPS system, driver behavior in car accidents and identification of the responsible party or factor, information on lost or spoiled goods, and any other information that enables insurance companies to access the system and pay for insurance related information.

Owners of transportation company/vehicle owners/drivers may use the system, and provide a small percentage of the income, the system allowing additional trips in a carpool fashion.

Additional cargo trips are made though the system carpooling between cargo companies, combining shipping and reducing unnecessary trips.

Sharing between companies is also made possible with the system of the present invention.

Mediating or arbitrating between conflicting parties on payments for services provided and collecting and collecting pre-determined percentage from payments made.

Improving transportation services and collecting pre-determined percentage from payment made to transportation service provider.

The database generated and maintained by the TIS may be approached by state authorities including tax authorities that may interrogate it on income produced. Accordingly, the TIS provides transparency of the revenues its administrator and FMSs produce and alleviates work carried out by tax departments regarding income tax calculation and collection.

Complementing Rules and Regulations

Currently, different countries around the world limit the use of vehicles to specific times of day. The system of the present invention allows monitoring vehicle activity and report on violation of the restrictions mandated by local authorities by collecting data directly from the vehicles.

Certain countries obligate installing "a black box" in vehicles. In the present invention, this box will not only be installed in vehicles registered in the system but the system will be able to report on exceptional situation and monitor routine activity in realtime. This will also limit the drivers' attempts to fabricate data related to their driving activity.

Accurate and up-to-date information on passengers and payment is made available by the TIS, since it identifies them accurately due to a checking data system, passengers and cargo pick up and drop off.

FMSs may be offered a waiver on existing clients. Namely, sharing of income will only be from additional income produced through the TIS between the system administrator and the administrators of the FMSs.

In one particular implementation, unused car parking may also be offered and negotiated through the integrated system of the present invention. This will allow, for example, to owners of car parking slots to rent them to interested car owners for a specific day and hour, particularly in overcrowded streets, neighborhoods or cities. An owner of parking slot may establish the transaction through the integrated system of the present invention and monitor it in real time with sensors and/or cameras installed in, above or in the vicinity of the slot.

The TIS also enables auction selling of ride tickets according to supply and demand. Users may approach a RS (Ride Sharing) module in the TIS that communicates with FMSs. The FMSs send the RS module offers for their available rides, and the RS classifies these offers according to selected parameters and present them to a user when partial or complete match with the user request is identified. This may be carried out in the following way:

The RS module uploads transportation requests submitted by users of the TIS in an auction;

Then the RS module transmits these transportation requests to a plurality of FMSs operating through the TIS;

The RS module then receives transportation offers for the transportation requests from the plurality of FMSs and displays them to the users;

The users elect their desired offers, which then the RS module communicates to the FMS that corresponds to the transportation offer.

In particular embodiments, the TIS is also configured to apply security and authentication protocols for said users, in order to maintain its integrity and allow only registered users and FMSs access to its resources.

In another particular embodiment, the TIS is further configured to apply filtering protocol between its users and FMSs so that only data required for the execution of transportation services is transferred to the FMSs.

The system of the present invention is attentive to users and receives feedback from them with regards to possible functionalities that may be added to, deleted from or modified in the system for improving service.

The following will describe particular and non-limiting examples of the present invention with reference to the drawings without departing from the scope and spirit of the present invention.

DETAILED DESCRIPTION OF THE DRAWINGS

The present invention pertains to a transportation management system that integrates fleet management and ride sharing functionalities in a single platform. In this respect, the TIS provides a platform for cooperation among several platforms that provide transportation services and platforms that provide sharing of social connections and information databases. This system communicates transportation solutions at any scale required by users, individuals and transportation service providers, namely local, national and global.

System Structure and Operation

Figure 1A:
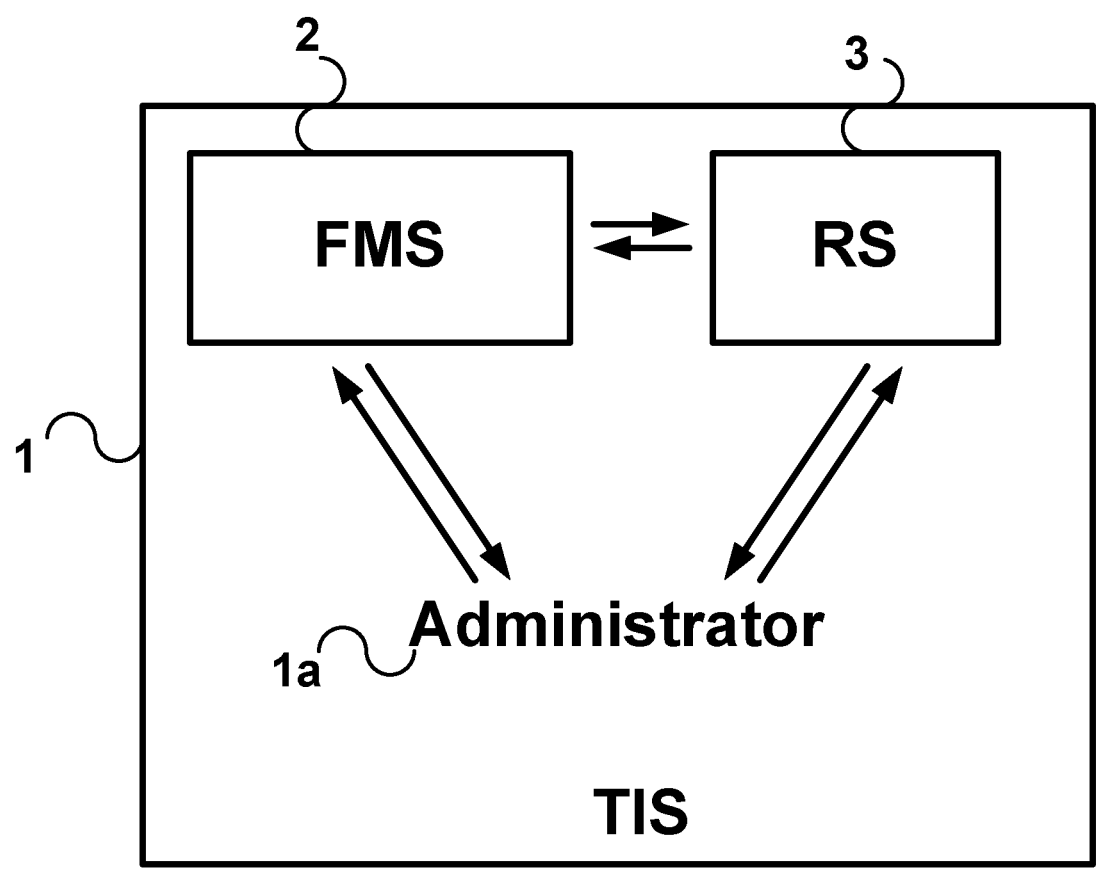
FIGS. 1A-1B schematically illustrate the integrated system of the present invention.
Figure 1B:
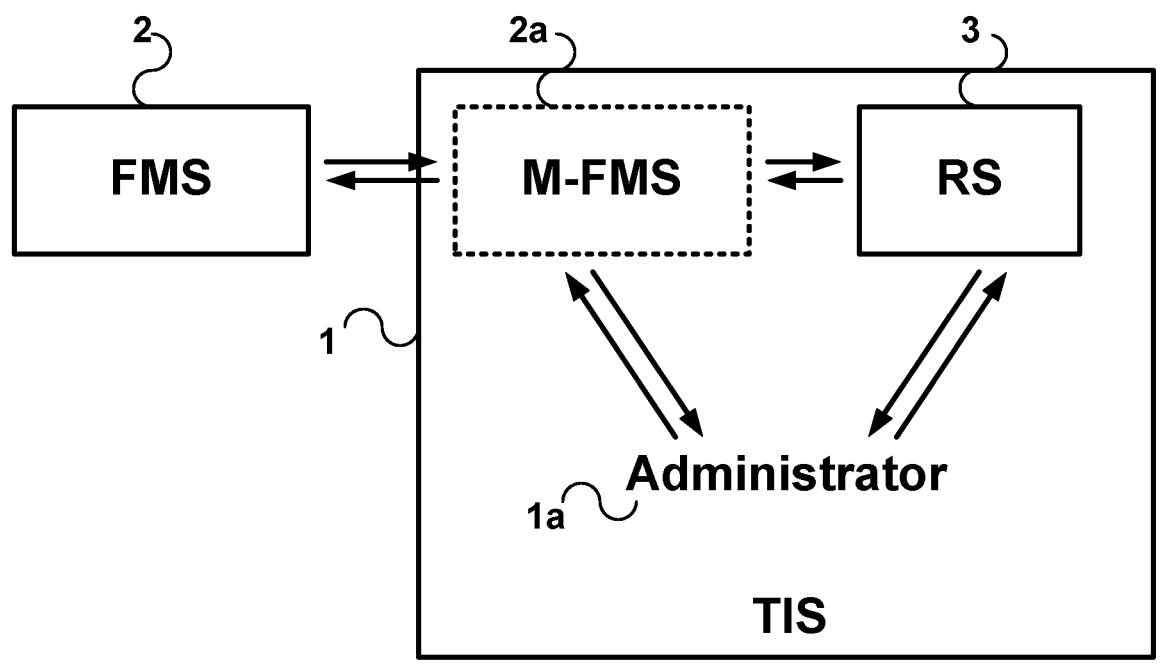

FIGS. 1A-1B, referred to below, illustrate the concept of integration between the two systems, fleet management and ride sharing. Such is not trivial, since the inter-communication between the two requires at least one layer for screening and/or communicating. The following details the structural and functional characteristics and requirements necessary to accomplish proper integration between fleet management and ride sharing in the system of the present invention:

Separation between Functionalities—Current State: Working with the existing fleet management system requires modifying its software to operate separately from the ride sharing system. This includes managing separate time table, work arrangement, clients list, price list, costs, data relating to driver and vehicle etc. The option of advertising rides available for passengers on the ride sharing system should also be available for the fleet management system in order to cooperate with the ride sharing system. Other actions that require communication between the two systems include making payment or communicating with the passengers. These actions should be synchronous only with the rides produced through the ride sharing system that enables a vehicle to make them.

Additionally, a system for managing the operation after setting a ride is required to extend control on the number of passengers if any to the fleet management administrator. In general, there should also be a system for confirmation of passenger payment (some countries requiring advance payment to make the ride legal in the eyes of the law).

FIGS. 1A-1B are schematic illustrations of the structure of the Transportation Integrated System (TIS) (1) of the present invention. In particular, vehicle fleet companies (Fleet Management Systems—FMS) (2) may partially or fully manage their transportation activities through the system (1) of the present invention. That is, the TIS (1) of the present invention provides fleet companies a platform that enables them to establish partially or fully FMS (2) in the TIS (1) through which they can offer transportation services that may be supplemental to the services they offer through their separate systems. On the other hand, vehicle fleet companies may also manage their entire business with the TIS (1) of the present invention, namely offer, deliver, register, monitor and charge for all transportations services only on the TIS (1). In this respect, fleet companies can manage their activities in their entirety with the TIS (1), thereby relieving them from costs of establishing and managing their own systems. FIG. 1B illustrates fleet company that establishes Mirror FMS (M-FMS) (2a) of its original FMS on the TIS (1). The company may then selectively uploads transportation offers on the M-FMS (2a) that it wishes to make available through the Ride Sharing (RS) (3) module rather than to its direct customers outside the TIS (1). In both cases in FIGS. 1A-1B, the FMS (2) or M-FMS (2a) communicate with the (RS) (3) module on the TIS (1), where such communication is mediated, negotiated and/or supervised by the Administrator (1a) of the TIS (1). The RS module (3) lists current and prospective rides offered and uploaded by the FMSs (2), where the TIS (1) may provide the FMSs (2) free access to the RS (3) limited to supervision and management of display by the Administrator (1a). In accordance with the above, the TIS (1) provides masking capabilities to the FMS (2), allowing them only secure access to their private database on the TIS (1) and selective sharing of information with the RS module (3) or Administrator (1a). The TIS (1) thus provides secure channel for every FMS Administrator (6 in FIG. 5) for either uploading or retrieving data from the FMS (2) or M-FMS (2a) it manages on the TIS (1). Secure channel may also be established between the Administrator (1a) and the FMS (2) or M-FMS (2a) and their FMS Administrator (6), particularly for payment transfer as discussed herein.

Figure 12:
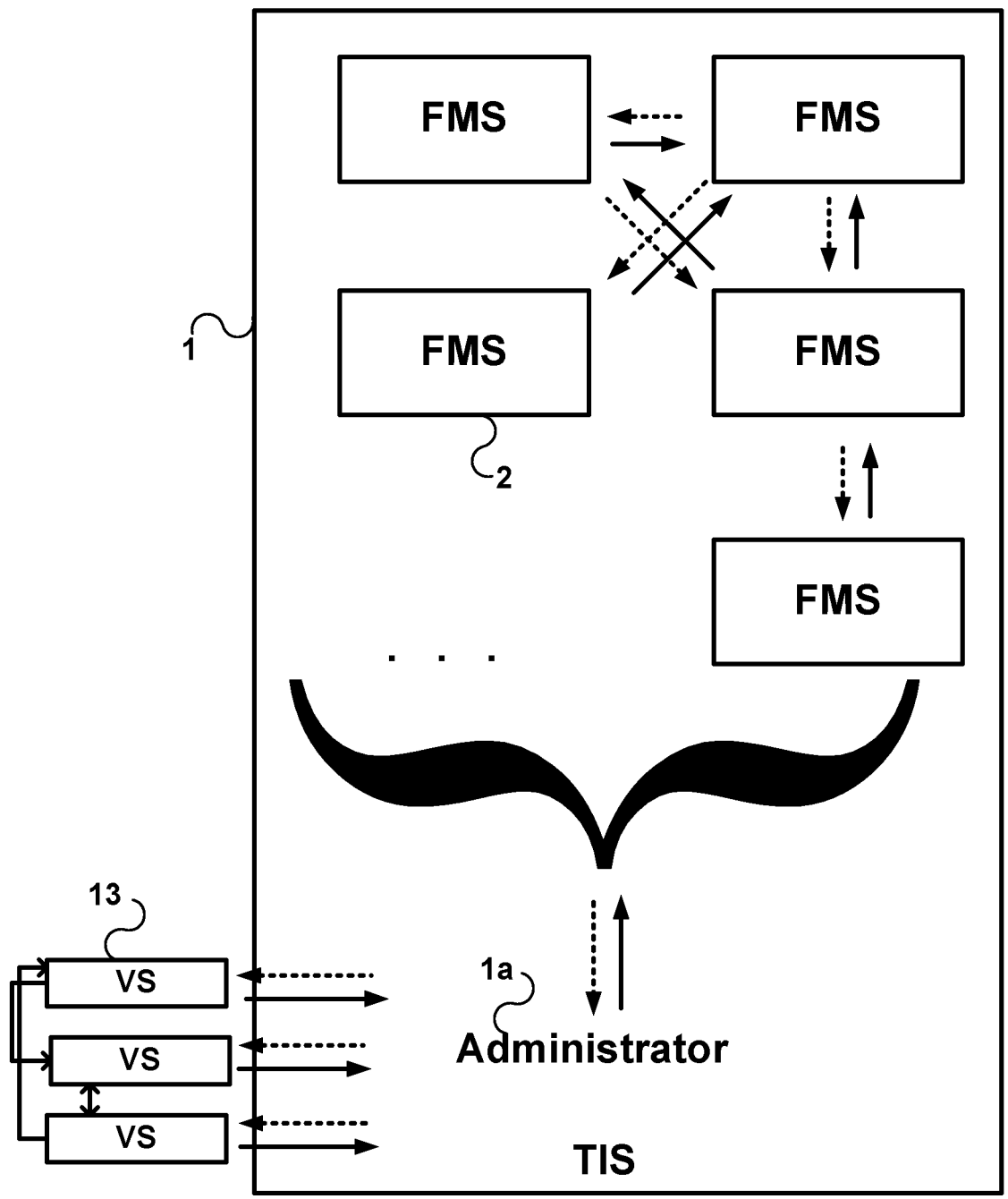
FIG. 12 schematically illustrates vehicle and fleet management system inter-communication supervised and mediated by the integrated system of the present invention.

Establishing Trips and Back Updating: The TIS (1) enables FMSs (2) to classify rides according to different parameters. Rides can then be offered to potential passengers connecting with the RS module (3), so that when a certain trip is made available, then additional passengers can be added based on available seats, for example. On the other end, the Administrator (1a) of the TIS (1) also provides additional data on the ride to the potential passenger such as driver name, type of vehicle, route, hour of the day and available days on a work schedule or a particular time frame, e.g. next coming week, month, holidays etc. Accordingly, when communication is established with the potential passenger or an agreement is obtained on the ride with the fleet company (not the particular driver) then the TIS (1) updates the FMS (2) as well as the driver through the Vehicle System (VS) (13 in FIG. 12) on the supplemental passengers. In case the driver picks passengers up on his route without instructions from the TIS (1), then the TIS (1) also updates the FMS (2). This enables the FMS Administrator (6) to collect the payment for the ride directly from the TIS (1).

Collection and distribution of payment for rides is made by the administrator (1a) of the TIS (1) that also collects a certain percentage of the charge only for transportation services provided by the FMS (2) and communicated through the TIS (1). The module and process of fee collection is detailed more with reference to FIG. 11.

The TIS (1) may also comprise filters limiting access to information according to certificates issued, for example, by law, user approval, need for receiving or providing information and use of the information. The TIS (1) provides access to transportation companies and state, local or federal authorities and handle geographic areas of all scales (see FIG. 7, for example). The TIS (1) also generates a central database alongside sub-databases focusing on particular continents, languages and any other local need to be met. Access to the TIS (1) is universal from every place on the globe, which enables receiving information on regional, national, continental and global levels on all types of transportation. This information is available in different languages and analyzed according to different parameters by the database (4 in FIG. 2) of the TIS (1). Further, the TIS (1) enables reaching transportation agreements between transportation service providers regarding, seats or vacancies, logistics, goods and all other requirements for communication of transportation.

Figure 10:
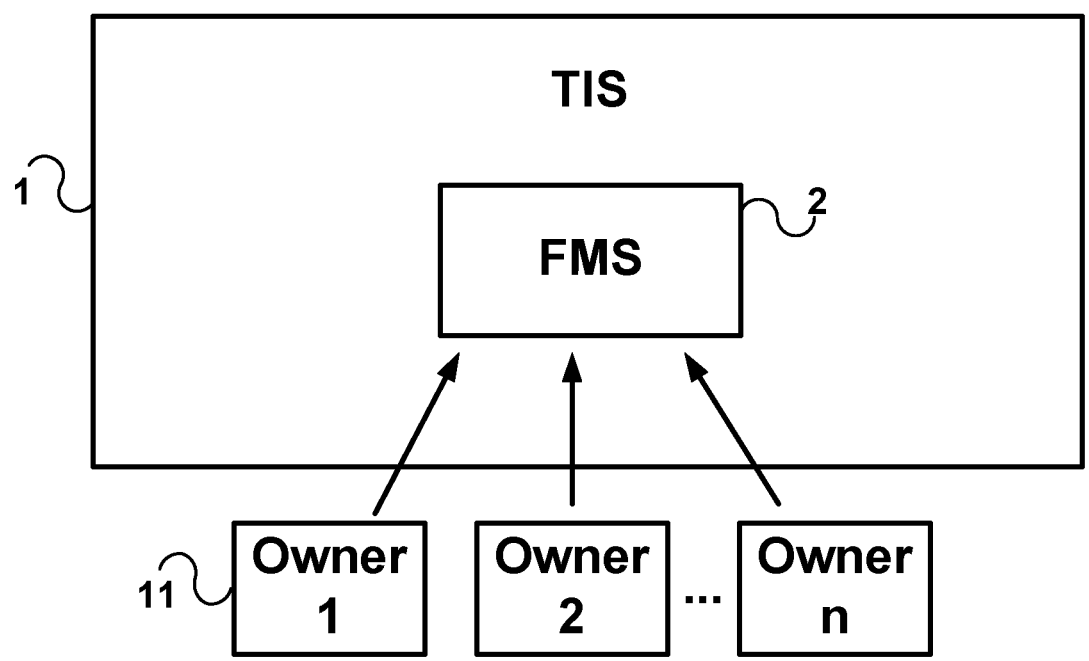
FIG. 10 schematically illustrates formation of fleet management system made possible by the integrated system of the present invention.

In both partial and full versions the use of the TIS (1) is provided free of charge to fleet companies, as well as to individuals (see FIG. 10). In particular, this free access to TIS (1) significantly reduces maintenance costs of the fleet companies. Especially those companies that carry out their entire business activity in the transportation management system (see full management configuration in FIG. 1A) are relieved from maintaining independent FMS of cost and labor.

The communication made available by the TIS (1) is automatic, unlike the manual one so far accustomed. The TIS (1) may include a screening and control functionalities for supervising the activities flowing through the TIS (1). This renders the TIS (1) more efficient, reducing costs of a complicated system as well as commission paid by the passengers or good owners.

Additional Functionalities and Services: The TIS (1) also generates a novel perspective on transportation. For example, the concept of cab driver as an occupation is generalized to every vehicle owner. The vehicle owners as the passengers then benefit from gas and money savings. Other examples for customizing and personalizing transportation include, for example, determining course according to passenger wish or fleet company.

Another layer of social network can be established on the TIS (1) that evolves from the multi-communication possibilities it generates. The users can use the TIS (1) as a social network to form groups around events and activities, open forums, initiate social activities through the system and use all the functionalities and capabilities it provides through the social network. This applies also to networking that is not necessarily related to sharing rides to particular destinations. Communication with external social networks (8a in FIG. 8) is also possible for retrieving information for the ongoing operation of the TIS (1).

Use of map database (8b in FIG. 8) for similar purpose is also made available to the TIS (1), where its own database (4) communicates with such external database, retrieves information relevant to particular ride, for example, and merges its with analysis according to every available parameter, e.g. route, traveling time, costs, etc. For example, the TIS (1) may be synchronized with a mapping system such as Google maps, WAZE (see external maps database 8b in FIG. 8) and other mapping systems to receive best route for driving. Optimization of route planning may also use maps database, internally manufactured (4) or external (i.e. 8b). For example, election of best route that includes several destinations for several distinct passengers or cargo among several possible routes may use maps database as described with reference to FIG. 7 and corresponding description.

The TIS (1) provides the fundamental platform for managing vehicle fleets and negotiating ride sharing. Accordingly, it global nature makes it adaptable to changes in technologies such as in Operating System, hardware used, whether mobile or not, communication, payment, data storage and retrieval.

Constructing Database and Providing Information: The TIS (1) may also establish a global transportation information center. All vehicles are required to connect to data gathering systems such as those of state authorities. This provides the capability of tracking, monitoring and controlling all vehicles following state laws.

The TIS (1) also pertains to national, land and international systems. Unlike many universal database systems, e.g. google search, facebook interconnecting between people, instegram for photo sharing, linkedin for business information transfer, wikipedia for scientific and other data, there is no global system that concentrates information on transportation. The TIS (1) may serve as information center on transportation and be available for search, responding to traffic problems, building logistics that concentrates all existing information on transportation, passengers and passenger travels, social networking, interconnecting between parties, concentrating all rides on transportation of goods, drivers data and payments.

Figure 2:
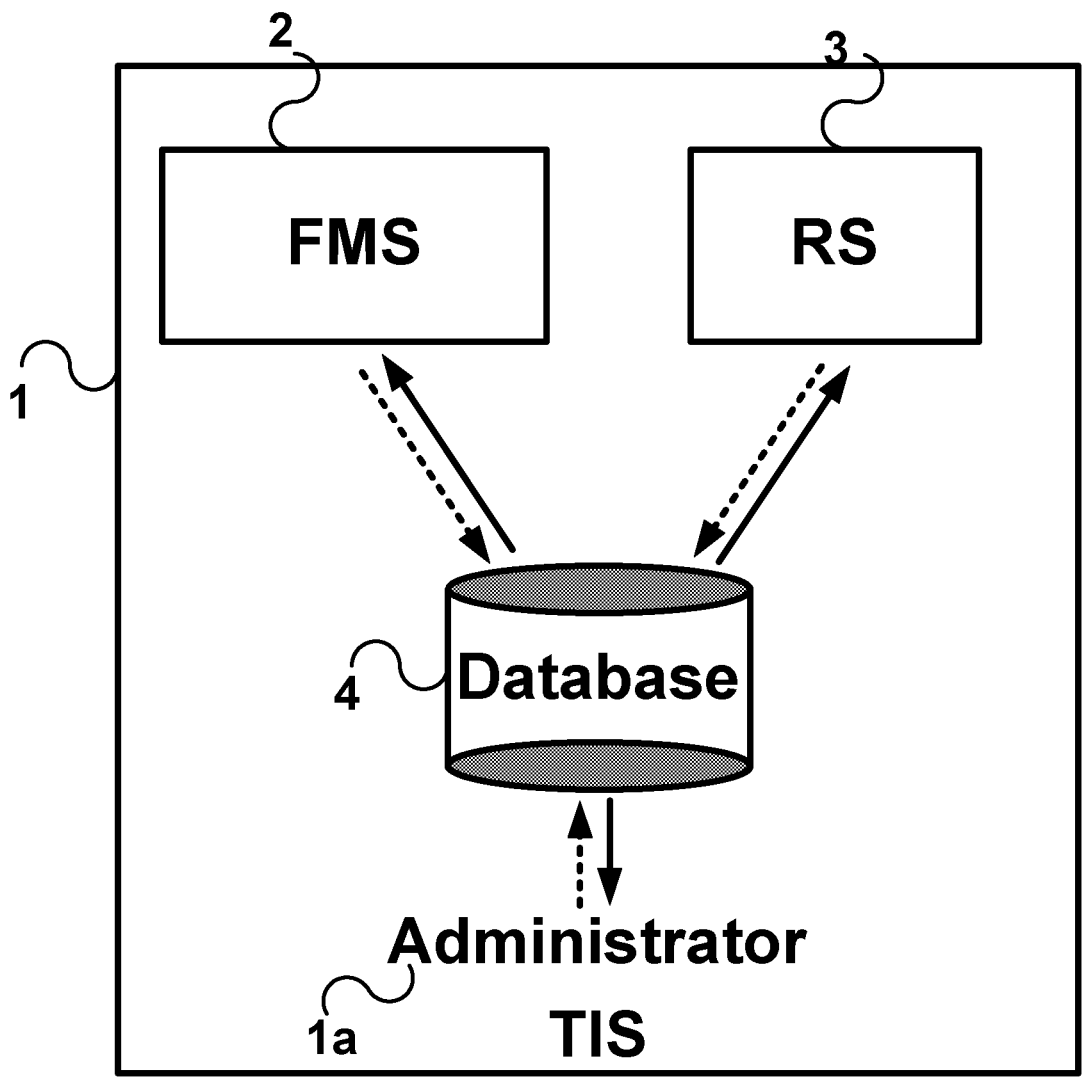
FIG. 2 schematically illustrate the database generated by the system of the present invention.

FIG. 2 shows that the TIS (1) also comprises data storage capabilities in a database (4) that it builds, manages and constantly updates on every user, individual or company that offers or receives transportation services through the TIS (1). The database (4) of the TIS (1) can be used for statistical analysis on different aspects directly or indirectly related to transportation. For example, statistical analysis of transportation services provided through the TIS (1) can be on traveling habits of users, change of residence, mobility of population based on changes in transportation services provided and so on. As seen in FIG. 2, the database (4) gathers information from the modules on the TIS (1), namely the FMS (2) and RS (3). However, external sources may also be accessed by the Database (4) for complementary information required for providing necessary data for ride sharing.

Access to Data and Analysis

The TIS (1) provides access to the information it compiles in its database (4) to certain authorities (5 in FIG. 4) for global transportation planning. For example, the TIS (1) may generate statistical analysis on transportation flowing through it and provide it to authorities (5e) responsible for directing and supervising transportation. Other examples of information provided may concern passengers and drivers. The authorities (5e) on their part may allow access to such information to users of the TIS (1), make payments based on this information, fill forms etc. Authorities (5e) may also check accuracy of revenues, better supervise transactions from taxation perspective and investigate total activity, which is not currently possible due to staff limitation. Private companies (5d) may also access the database (4) that the TIS (1) generates and deliver commercial information, business and transaction offers to users according to users consent. In general, the database (4) compiles information on passenger habits, tastes and preferences. Such information may be marketed if allowed by law to interested parties, for example, insurance companies, on traffic conditions or car theft. Commercial parties (5d) may also find the information valuable if it enables them making offers to passengers based on their location, e.g. restaurants or other consumable purchases.

The administrator (1a) may transmit the data received to a processing center that will also consider where and how to transmit results of data analysis made.

The TIS (1) may also check and confirm data it accumulates with state authorities such as the DMV (Department of Motor Vehicles) (5e) and other government authorities. For example, data received from road cameras may be used to validate the data collected through the vehicles and communicated to the TIS (1). The data may then be made accessible to users provided that it is allowed by the law.

The TIS (1) may also directly update insurance companies (5b) on car theft, car accidents and any other insurance involving events. Such information may also be included in the vehicles history and made accessible to potential buyers.

Figure 3:
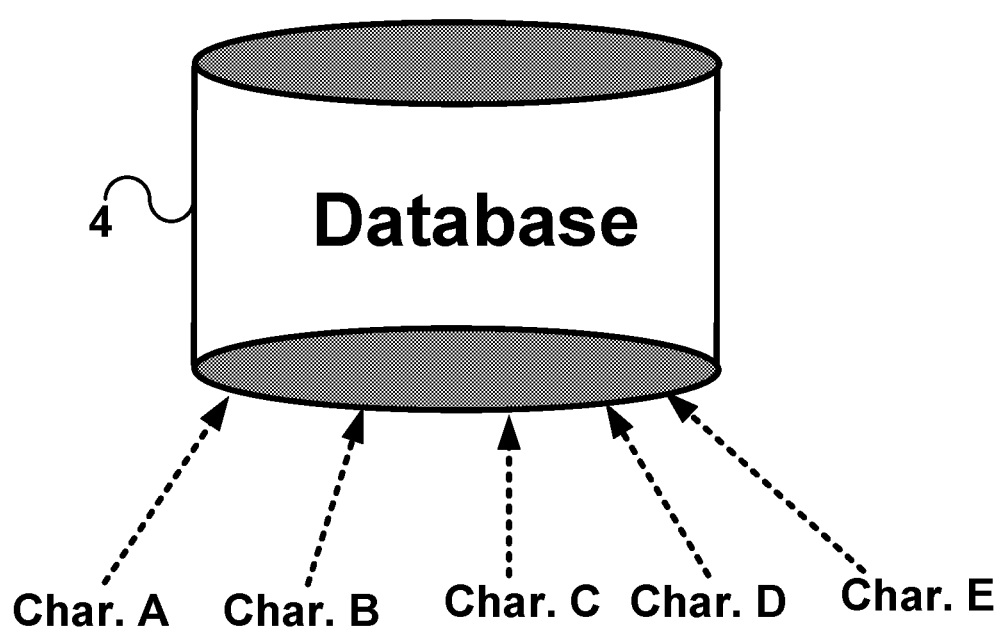
FIG. 3 schematically illustrates interrogation options available by the database of the integrated system of the present invention.
Figure 4:
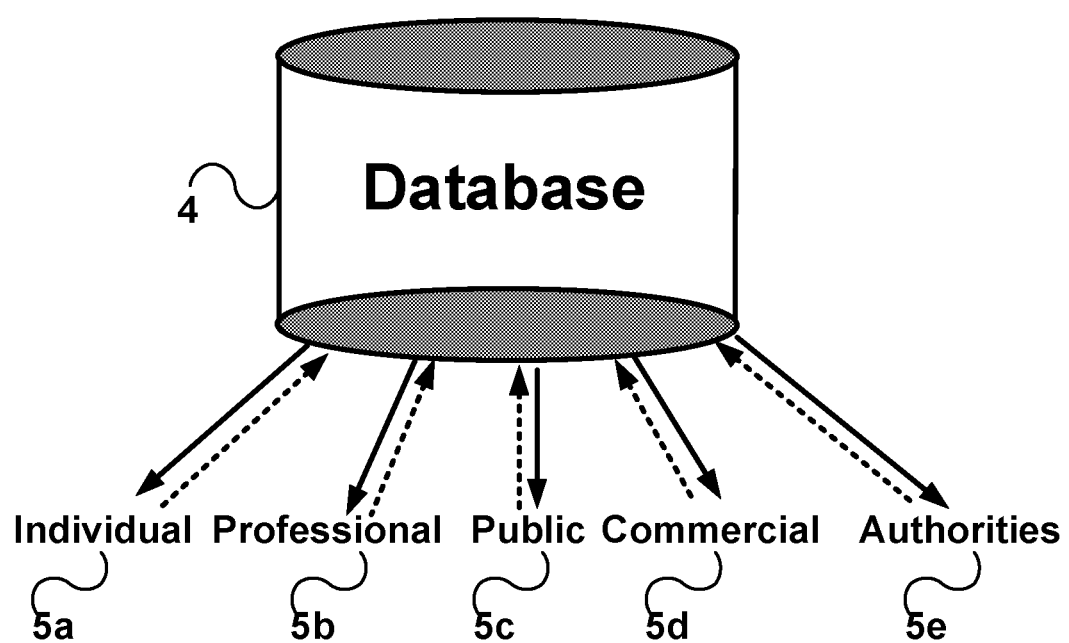
FIG. 4 schematically illustrates accessibility of the database of the integrated system of the present invention to different users.

The Administrator (1a) of the TIS (1) mediates requests for information retrieval from the database (4) and transfers the information to users approaching it. FIG. 4 shows certain possible applicants, individuals or organizations (5a-e), that may have interest in data accumulated in the database (4) of the TIS (1). The variety of applicants (5a-e) also demonstrates the variety of information stored in the database (4) and its use for different purposes. In fact, the TIS (1) also provides a search engine that enables applicants (5a-e) to filter information useful for their purpose. This is illustrated in FIG. 3, where the database (4) can be explored according to different characteristics, Char. A-E for example, or any other field of search, providing applicants with insights regarding transportation or activities and information surrounding or based on it.

Further, a commercially oriented aspect of using the database (4) may be by offering products and services to users based on their transportation consumption habits, e.g. their usual routes, traveling preferences, social of cultural activities arranged though the system, engagement with other users and so on.

Further, the database (4) that the TIS (1) generates and maintains is essentially and eventually independent of the actual transportation activity, and contains information that is not necessarily related to transportation.

One other possibility is to sell information to private and public companies, organizations or any interested party in accordance with the provisions of the law and ethic rules. User access will be allowed only with real data, keeping an updated true database available to users and authorities.

Bi-Directional Communication—As illustrated in FIGS. 1A-1B, the TIS (1) communication between the three parties, the Administrator (1a), FMS (2) and (RS) is bi-directional, which is made possible due to the platform that the TIS (1) provides. The communication possibilities as shown may be direct between the FMS (2) and RS (3) module for certain defined purposes such as uploading ride offers or indirect, mediated by the Administrator (1a) of the TIS (1). Accordingly, FMS (2) requesting to update its database, for example current vehicles, available seats and prospective destinations, may use the functionalities provided by the TIS (1), which may also mediate this information to the RS (3) module for uploading new offers for rides. This way, a fleet management company does not need to update twice, first its own FMS (2) and then the mediating TIS (1).

Figure 5:
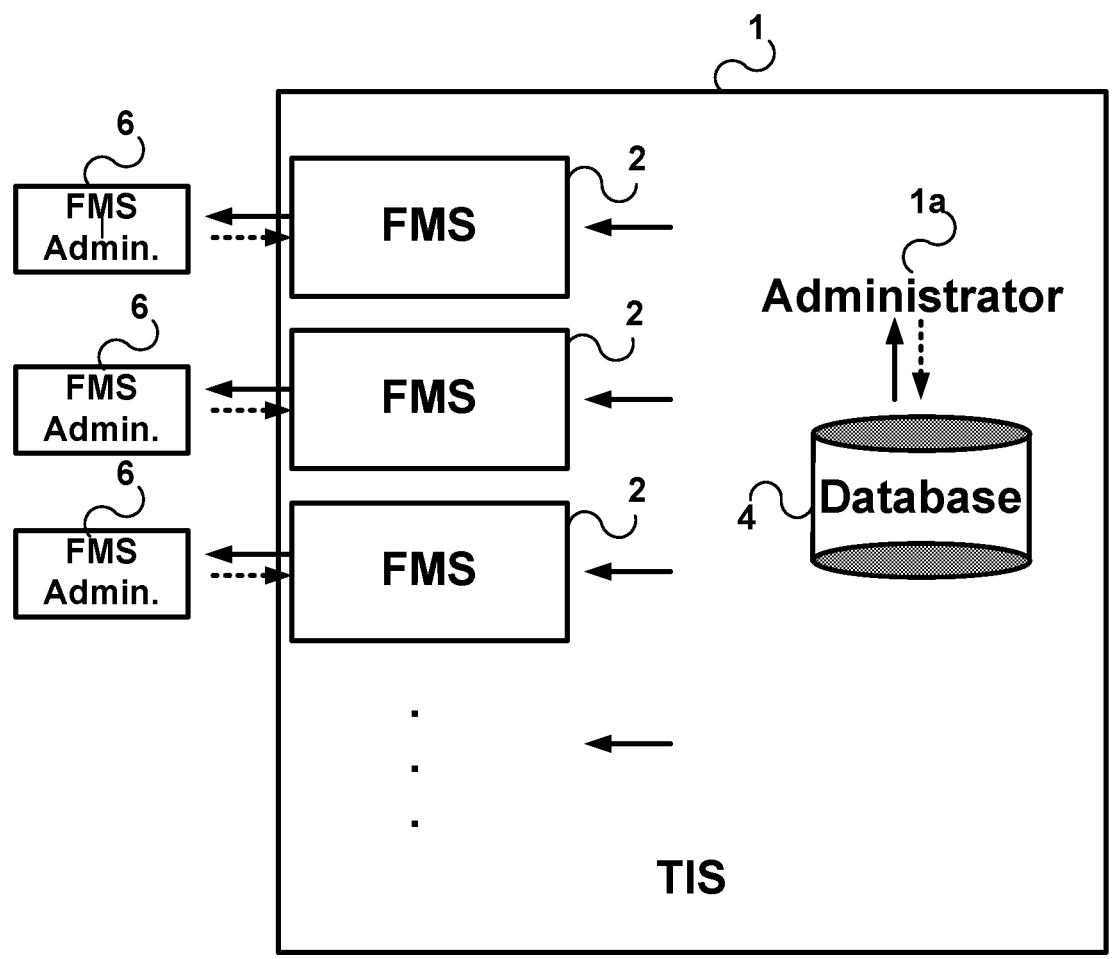
FIG. 5 schematically illustrates management configuration of fleet management systems operating the platform provided by the integrated system of the present invention.

In return, the TIS (1), either integrated or mediating, updates its own database (4) according to the updated database of the fleet management systems. Alternatively, as shown in FIG. 5, the Fleet Management System Administrators (FMS Admin.) (6) may update their vehicles and available seats status directly on the TIS (1) and continuously manage the data uploaded to the FMS (2). The Administrator (1a) of the TIS (1) will then back update the FMS (2) and RS (3) that communicate with it. This allows fleet management companies to directly offer the most updated rides to passengers through the TIS (1) without logging off and on for every update. The offers are also up to date to the time of their uploading, and therefore more certainly valid.

The TIS (1) may also allow individuals to form and/or join a group for sharing ownership, maintenance and use of a single vehicle for transportation. The group may manage the entire schedule and operation of the vehicle on the TIS (1), for example, by keeping a permanent record in the system register and updating it according to the vehicle activity, status, condition, expenses, location and so on. The following describes how this is carried out.

Free Access—Managing FMS (2) on the TIS (1) is made possible with free access without limit and additional premium services for a fee. Accordingly, any vehicle owner or group of owners can access the TIS (1) and all services for free and establish his or theirs own FMS (2), instead of, for example, paying for rights of use and maintenance of fleet management system as is the case now. This is illustrated in FIG. 10, where a group of individuals (11) may interconnect either outside or through the TIS (1) and form independent FMS (2) that owns at least one vehicle. Then, the newly formed FMS (2) may start to offer rides through the RS module (3). This way, companies and vehicle owners can make extra profits from this free access that up till now have not been accessible to them at all. The integrated system of the present invention provides ample possibilities for making extra revenues without extra costs to the vehicle owners. The system only shares a small percent of the extra income with the vehicle owner.

Passengers Identification and Collection of Payment

The TIS (1) generates supplemental income to vehicle owners enabling them to make additional rides ordered in advance as well as casual rides. Regardless of the type of ride, the TIS (1) employs means for identifying passengers going on board the vehicles combined with a payment system. This can be done through the TIS (1) or the vehicle itself and respond to fleet companies need to receive updated and true reports on payments made on rides negotiated through the TIS (1) or otherwise made. The passengers identification means may be facial photographing, fingerprints or through their mobiles, using an appropriate smartphone application version of the TIS (1). Since the TIS (1) is essentially an open platform that communicates information between parties negotiating with each other through it, it may receive passenger identification according to any available technique or technology.

In particular, the TIS (1) may also use identification of passengers using GPS, which may be built in a passenger smartphone, cameras and any other electronic signaling means or tag that relates itself to the location of a passenger.

It should be noted, that such location identification means may also be used to geographically locate also the vehicles, through their VS (13 in FIG. 12) that provide ride-sharing services through the TIS (1). This way, the TIS (1) may also construct a constantly updated map that identifies the vehicles, i.e. VS (13), in a certain geographic area in any given moment.

The TIS (1) may also identify car stop and passenger going on board of a vehicle in one or more of the options detailed above. At this stage when the passenger makes payment for the ride in advance, the TIS (1) informs the FMS (2) through the driver's smartphone or directly through the driver's connection to the FMS (2). In case no advance payment is made and a ride takes place, the TIS (1) bills the passenger directly through his smartphone using electronic payment. In case of direct payment to the driver the payment is registered at the cash register in the vehicle, VS (13), that is connected to the TIS (1) and transfers the information on payments. In the options of electronic and direct payments, the money is transferred to the vehicle owner through the TIS (1). In any case, the vehicle owner is aware of the passenger boarding the vehicle and paying for the ride. The TIS (1) is notified on the passenger getting off the vehicle at the destination agreed upon in advance, based on the same identification means used for confirming his boarding. If the passenger is not identified leaving the vehicle at the destination then in accordance with the appropriate payment made, the TIS (1) alerts the driver visually or audibly. Use of pop-up window on the passenger smartphone or display screen in the vehicle is also possible for alerting on the payment due. The passenger is also notified on the end of his ride and the supplemental charge for the additional ride beyond his original destination. The passenger photo appears on the driver's display, enabling him to locate the passenger and/or make his photo public on a television or smartphone screen. Accordingly, the passenger is approached and required to supplement payment for the additional ride. The mode of payment may be any mode acceptable by the parties negotiating the ride through the TIS (1) and that may be recorded and reported through the TIS (1) to all parties involved, i.e. FMS Administrator (6), vehicle owner, passenger receiving receipt for his payment and any party with clearance to this particular information approved by the TIS (1).

Another possible action after distribution of payment (140 in FIG. 11) between the parties involved in providing the transportation service is immediate tax payment. Secured connection between the database (4 in FIG. 4) of the TIS (1) and the database of the tax authorities (4e in FIG. 4) may be established and the revenues reported will be taxed and paid directly upon completion of the transaction.

As mentioned above, in one option the TIS (1) enables visual identification of passengers based on photo taking when mounting on board of the vehicle and getting off of it. It does not require high security classification, therefore, complicated face recognition software and systems are not necessary to ensure security. Passengers' photos may be deleted after use, since they are only used for identification for a specific ride. Therefore, the TIS (1) does not need to employ huge memory space for a database of photos. On the other hand, the TIS (1) may interface with any face recognition software and hardware means. Accordingly, it is adaptable to any advanced face recognition system that is capable of communicating with it.

Federal, national, state, local or any other official authority may send messages to drivers and passengers through a mobile application of the TIS (1). The TIS (1) extension in the vehicle, i.e. VS (13) in FIG. 12, or the application opened by a passenger will operate in an ongoing fashion, and will not be limited to particular times of communication. Accordingly, the messages may arrive to users at their locations. The mode of such messages may be SMS (Short Message Service), e-mail, or any other online method, e.g., through the internet (e.g., social networks).

Currently, many car manufacturers market partly or entirely computer controlled or computer embedded vehicles. Therefore, the TIS (1) can synchronize with such computer-based system in the vehicle for gathering and analyzing information on the vehicle and producing results and conclusions to the driver and vehicle owner, for example, on the current status of the VS (13 in FIG. 12), location, number of passengers and so on.

The TIS (1) synchronizes with payment system so that passengers can use it as electronic wallet for payments through smartphone application and the vehicles themselves.

Figure 11:
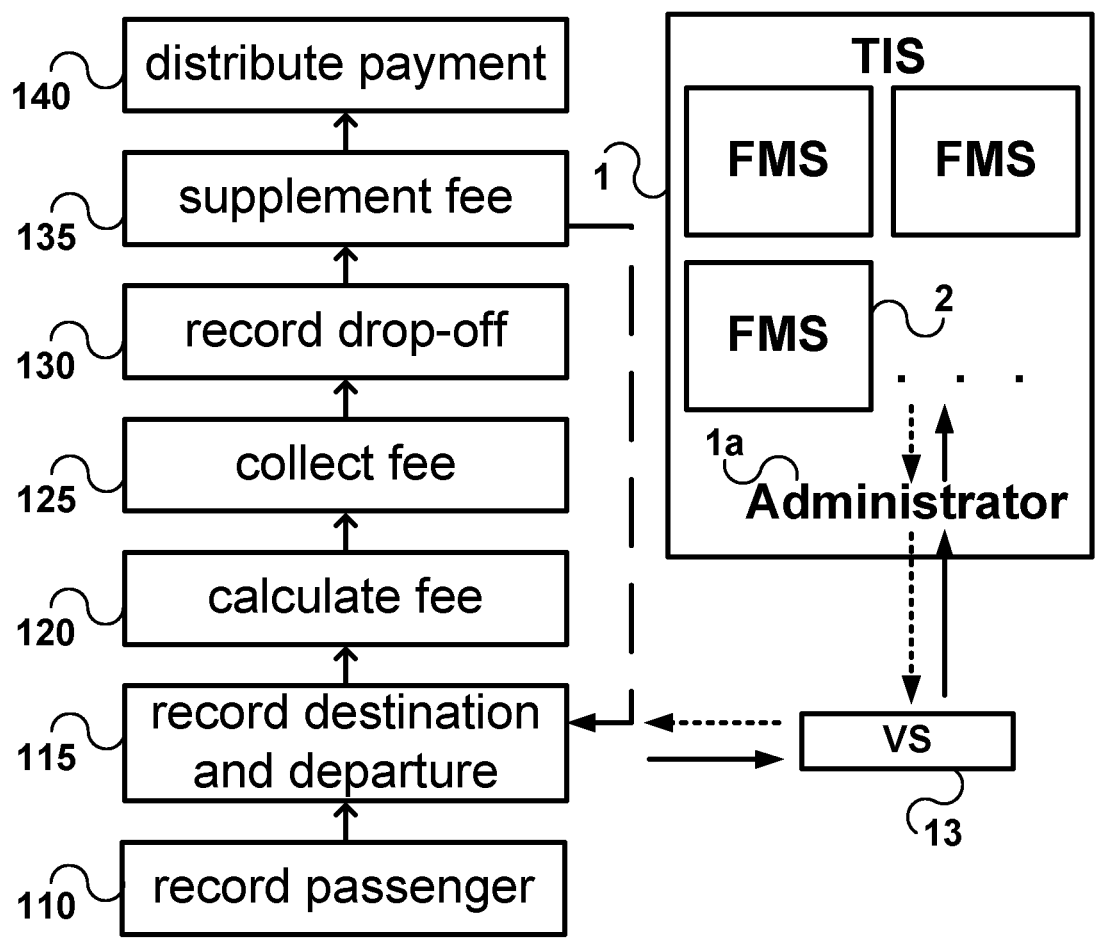
FIG. 11 schematically illustrates fee charging procedure for a ride with a vehicle of a certain fleet management system supervised by the integrated system of the present invention.

Monitoring and Control of revenues is made available through the TIS (1) as shown in FIG. 11 and explained below. Vehicle System (VS) (13) is installed on the vehicle of an FMS (2). The VS (13) records the transportation activities taking place on the vehicle. Namely, it records passengers boarding the vehicle (110) and their declared departure and destination (115) and calculates the fee due for the ride (120). Then it records collection of the fee (125) and records the drop-off point (130). If the drop-off point is not identical to the destination point recorded upon boarding, the VS (13) alerts the driver, returns to step (115) for updating destination, calculate the supplemental fee and collect it (135). The VS (13) either transmits the information for every ride and passenger to the TIS (1) Administrator (1a), or the Administrator (1a) interrogates the VS (13) and retrieves the necessary data. Then the Administrator (1a) interrogates which FMS (2) on the TIS (1) is involved in the particular ride according to the VS (13) and information obtained and accordingly performs calculation of payment due to the TIS (1) and FMS (2). Distribution of payment (140) is made immediately if done electronically through the VS (13) or registered and monitored if done with cash to the driver. Collection of payment from the driver is then carried out by the FMS Administrator (6 in FIG. 5) and commission transfer from the FMS (2) to the TIS (1) is supervised and registered by the Administrator (1a).

The TIS (1) registers every ride including route, date, time, FMS (2), VS (13) pick-up and drop-off points, type of transportation and passenger (person or cargo) and any other relevant data and corresponding payment. The TIS (1) synchronizes with other recording system including its own database (4) and transfers the information to them in real-time for storage and future confirmation and backup.

It should be noted that the free of charge access to the TIS (1) does not relate to supplemental payments collected from a user. Rather, the Administrator (1a) and the FMS Administrator (6) share the supplemental income in a certain ratio of, for example, 95%:5%, FMS Administrator (6):Administrator (1a). This model provides incentive for fleet companies to utilize the system of the present invention for communicating extra travel and shipping services.

It should be noted that the commission that the integrated system charges for transportation transactions made through its free access use is not limited to a particular ratio.

A ratio of 95:5 percent revenue splitting is only an example for charging on the added value the system provides to users, which is the managing, maintaining, control, monitoring and registering functionalities the integrated system provides to fleet management administrators free of charge. This essentially generates increased available cash flow to fleet companies, which in turn increases their profits. Further, the free access characteristic of the integrated system of the present invention creates the advantage of interfacing with other systems, e.g. carpool systems. This is because, fleet companies will tend more to direct the flow of supplemental transactions ride sharing through the integrated system, thereby increasing its traffic volume. This will result in a system that practically monitors all transportation activity done at global and local levels. In view of the above, the TIS (1) provides complete control and monitoring capabilities on the revenues to vehicle owners. Complete control and monitoring on each additional passenger and income is also provided. Further points of control and monitoring with regard to the vehicle fleet and VS (13) refer to locating vehicles in cases of car theft, exact responses in case of car accidents, driver road behavior, loading of luggage, cargo, merchandize and goods for supplemental payment, technical systems of the vehicle, driver rest and work hours, communication with the driver and trip routes. Such data is transmitted to the Administrator (1a) of the TIS (1) after active or upon automatic interrogation of the VS (13). Reports on such information may also be provided by passengers boarding the vehicle with direct access to the TIS (1). The data is recorded at the TIS (1) database (4) and provided to the FMS (2) involved (see FIGS. 5 and 11, for example).

The global character of the TIS (1) enables it also to charge toll payment and transfer them directly to local or state authorities.

The TIS (1) can be based on fixed prices but can also act as a stock market negotiating between supply of and demand for travels. Namely, the TIS (1) allocates particular ride to the best offer according to certain criteria set by a person looking for one and FMSs (2) offering it. In this respect, the TIS (1) acts as a stock market of ride sharing for passengers and goods. The ride is allocated when the terms including price of both parties, e.g., passenger and company, are met. The TIS (1) itself can also retrieve and offer the best and cost-effective option for a ride for passengers who feed the particular conditions for a ride they want.

Figure 9:
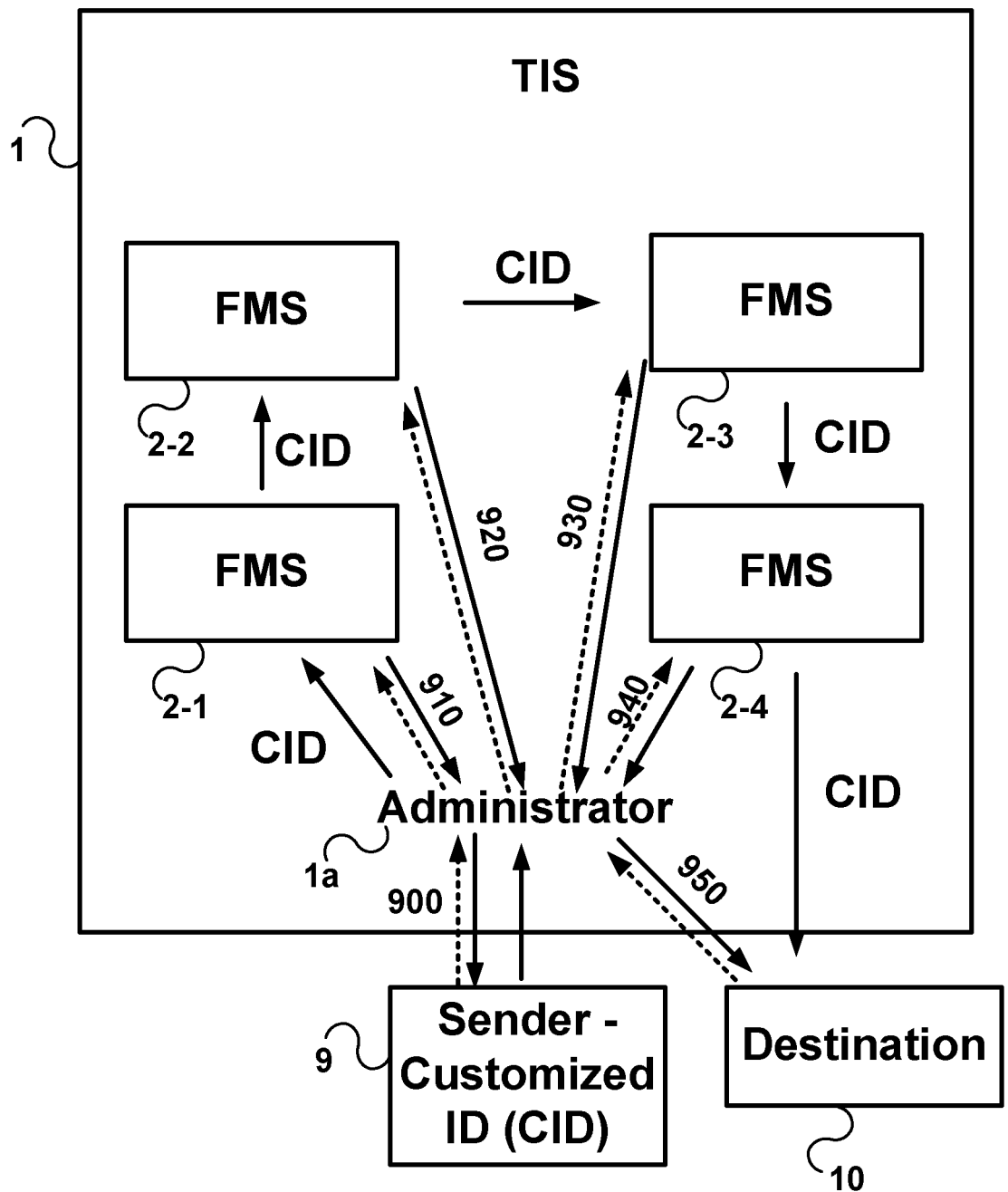
FIG. 9 schematically illustrates cargo shipping method supervised by the integrated system of the present invention.

The system of the present invention enables individually initiated and performed shipping. This is illustrated in FIG. 9 related to in the following example. An individual sender (9) may hire the transportation services of other individual vehicle owners, FMS (2-1), for private shipping of goods and packages. The sender (9) marks the goods or package with a code and signature of his own making (CID), takes a photo of the code and signature, uploads them to the package/goods record on the system shipment register and resets its status together with other relevant data, e.g. package size and weight, content (e.g. fragile or not), destination address etc (stage 900). Each one of the persons handling the package updates its location and status in the package record in the Administrator (1*a*) until its arrival and the sender (9) can track its course from pick up to drop off (stages 900 through 950). Any one of the receivers of the package (FMS 2-1 to 2-4 and destination 10) also takes a photo of the sender's signature and code and uploads it to the package record for the sender (9) to view that his package arrived at its proper intermediate or final destination. GPS means can also be used to track and monitor the package route until arrival to final destination (10). This mode of assigning bar code to packages renders any global system of bar code unnecessary, allowing any sender (9) to create his own signature and code.

Merchandize can otherwise be tagged with a GPS tracking chip that alerts the driver and sends information to sender (9) on location and status. Another option is to attach a code to the merchandize that the driver can read from the smartphone together with corresponding instructions on destination (10), recipient and route and updated data on location and status.

Cooperative Ride Sharing Among FMSs

Figure 6:
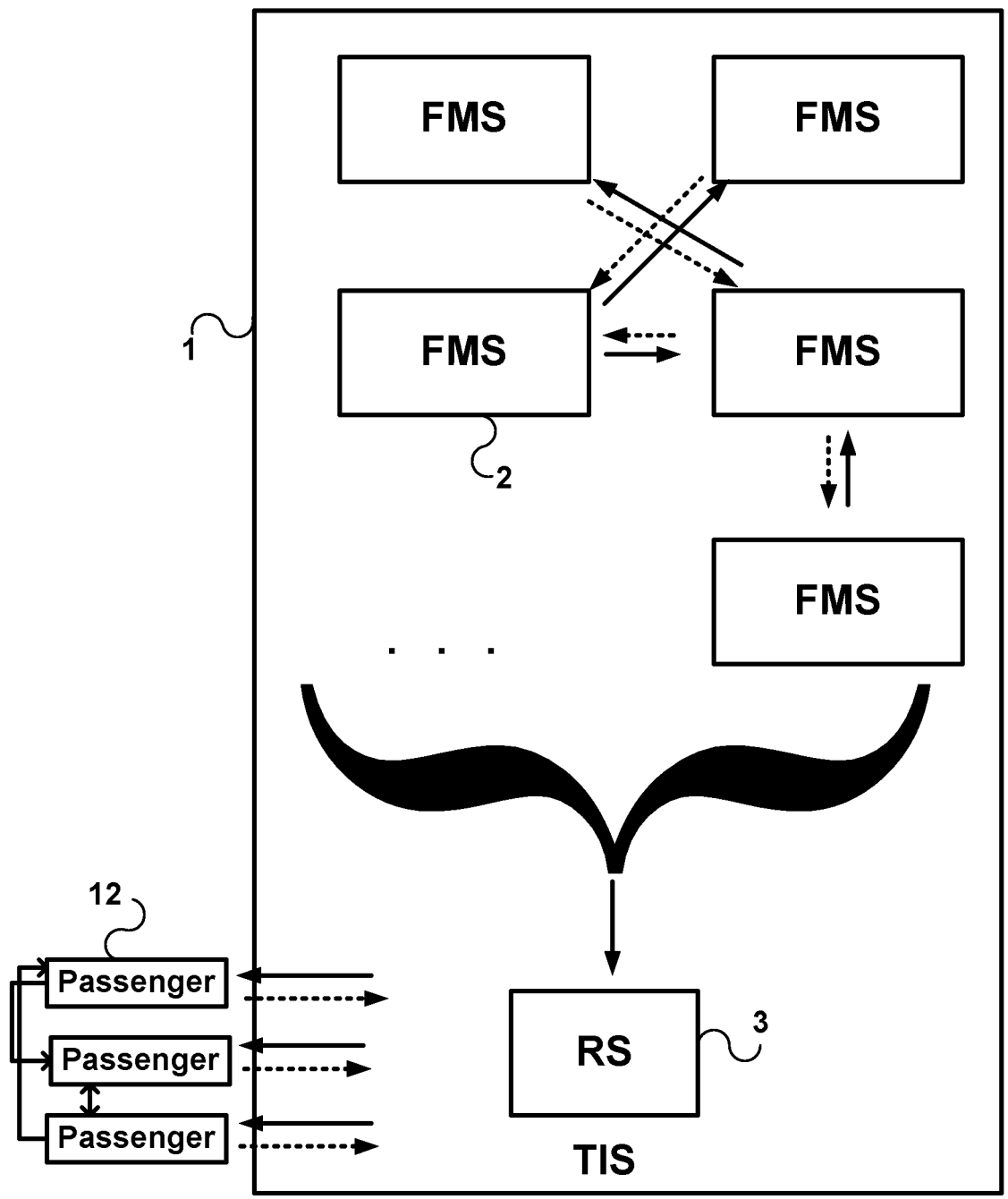
FIG. 6 schematically illustrates methods and options for creating shared ride made available by the integrated system of the present invention.

Multiple rides may take place through the TIS (1) by sharing between fleet companies. The TIS (1) concentrates all possible rides, passengers and shipment of goods making all rides more efficient to all fleet companies that manage FMS (2) on the TIS (1). See, for example, FIG. 6 illustrating FMSs (2) communicating with each other and delivering combined offer for a ride to the RS module (3). Potential passengers (12) may then examine the offer by interrogating the RS module (3). Further, the passengers (12) may communicate with each other through the RS module (3) to explore whether a partly or fully shared ride between them can be arranged. For example, two companies, i.e. different FMSs (2,) can share a ride between departure and destination points in a single fully occupied vehicle instead of two half empty ones of both. This may take place only through the TIS (1) that mediates between the companies without compromising their own FMSs (2).

As demonstrated and described above, The TIS (1) enables passengers (12) to communicate between themselves, creating groups according to similar features owned by group members. For example, passengers (12) may join together according to shared workplaces, neighborhood, prospecting events or even fans of certain sports teams, e.g. soccer, football, basketball. The TIS (1) allows members of these groups to organize shared rides. It should be noted, that any passenger (12) using the TIS (1) may team with more than one group.

The TIS (1) keeps communication deployment between passengers (12 in FIG. 6) connected among themselves as closed or open groups, organized for particular reasons such as events, sharing similar interests or hobbies such as sports group fans, work colleague groups, etc. The group members can organize travels among and for themselves through the TIS (1), for example commuting together or traveling for a particular event. A user can participate in several groups simultaneously without any limitation on the number of groups he is allowed to join.

The TIS (1) also serves as a center for cooperation among fleet FMSs (2) regardless of their size, large, small, including single vehicle and even privately owned vehicles. All types of FMSs (2) can offer ride sharing for passengers (12) and goods through the system that connects between them.

As shown in FIG. 6, The TIS (1) also enables direct communication between the FMS Administrators (6 in FIG. 5) and drivers of the vehicles, where the TIS (1) regulates this communication as well as allocation of rides and data to companies that advertise their services through the RS module (3). The TIS (1) also manages database (4) that contains all data concerning the rides and continuously updates it based on available seats and places for passengers and goods. This includes also fully and partially available seats, for example return rides that are empty in either direction and can load passengers and goods on their way and back.

Each fleet management company is allowed to determine the terms of offering available seat or place for passengers and goods. Such terms may be, for example, geographic, e.g., the location of its vehicles relative to the location of potential passengers or goods, expected profit from a particular ride or based on available seats or place. Accordingly, all companies participating in sustaining the TIS (1) split the revenues and spending relative to their share.

Search and Use of Map

The TIS (1) enables users to mark points on their route on a map so that the ride itself and search as well are not randomly selected, namely particularly selected from several options of getting from one point to another. Accordingly, the users may also pre-select a specific route for their ride. This may enabled due to the communication of the database (4) to external map database (8*b*) (See FIG. 8). Any user (14) may interrogate the TIS (1) database (4) through its administrator (1*a*) on preferred route from one point to another. The database (4) will then consult map database (8*b*) and merge it with additional parameters of available rides retrieved from the RS module (3), e.g. cost, travel time, particular locations on route, particular fleet company, i.e., FMS (2), etc. The Administrator (1*a*) then outputs several possible routes for the user (14) choice. When several potential passengers (12) are involved, see FIG. 6, and share at least some section of the requested ride, the Administrator (1*a*) will suggest each of them a combined route at relatively better cost effective terms.

This route pre-selection generates a more accurate result compared to other transportation services, public or private, e.g. trains or MOOVIT application, which are not configured to respond to specific needs of passengers. The current transportation providers adapt themselves to the existing situation of available transportation. Additionally, lack of communication and driving agreements between passengers and transportation providers, public or private, does not allow the passengers to bargain for a better deal, price-wise or for route selection as in the present invention. For example, trains follow particular pre-determined tracks and MOOVIT application enables giving route directions. However, these two are not price-based and of course are not flexible to the passengers needs. Rather, the passengers have to adapt themselves to the transportation providers without dynamic communication with them. Further, the search for a route in these two options is based on actual parameters of existing public transportation disregarding the needs of passengers. In addition, they do not provide a communication channel between passengers and the particular transportation service or an option for establishing a transportation agreement between passengers and transportation companies. In this respect, the present invention provides the following advantages compared with the existing transportation services:

1. Passengers select their transportation provider according to price offered.
2. Passengers may communicate with the driver or fleet company through the TIS (1) platform.
3. The transportation providers, e.g. fleet companies, adapt themselves to the passengers' route and price requests.
4. Passengers are given multiple options for selecting their particular ride according to bargaining on price and route, e.g. driver, passengers, particular fleet company.

Use of Hardware

The TIS (1) may be established on a plurality of communication routes and backup infrastructure including server clouds and external service systems such us GPS, telecommunication and backup systems of other existing communication networks. Further, the TIS (1) may also communicate with other service system, such as billing and/or payment systems and messaging systems to support the services that the TIS (1) itself offers.

The main contact between vehicles and control center of a fleet company, for example, or any other control or monitoring on the vehicles may be carried out through one or more communication means installed in the vehicles. Examples for such means are tracking devices, smartphones or any other mobile telecommunication devices. Additionally, the vehicles themselves may have independent communication system, see the VS (13) with respect to FIG. 12, capable of processing data and transmitting them to their appropriate FMS Administrator (6) or any other external server system.

Further, cameras and other photography means may be used to monitor activity on the vehicles. Computerized cash register systems, communication network systems in the vicinity of vehicles passing on the roads may also interface with the vehicles. For example, built-in and mobile systems that operate or communicate with barcode readers, medium servers, microphones, speech recognition/identification, speakers may also interface with the vehicle to collect information on the vehicles in motion and stream it to the TIS (1).

In addition, sensors installed in the vehicles may be connected to the TIS (1) and provide information on traffic, the drivers and vehicle, fuel tank state, speed, location, road behavior, weight, break hours, temperature, motor state, compartment state, luggage and other data relevant to the road, vehicle, driver and passengers. The Administrator (1a) continuously interrogates the VS (13) and retrieves the desired data or the VS (13) are configured to periodically or instantly update the TIS (1). The data is stored in the database (4) and further analyzed in comparison to total traffic on the road and other vehicles sharing the same route. Cameras installed inside and on the outside of the vehicles may be connected to the TIS (1), streaming visual information on the vehicles. GPS means and other tracking means may also be attached to the outside and inside of the vehicle to streamline information to the TIS (1).

Additionally, the vehicles and fleet companies, for example FMS Administrator (6), may communicate with each other in bi-directional fashion. Bi-directional communication may also be made between passengers and drivers if authorized by the fleet companies, i.e. FMS administrators (6). Such communication will, of course, be supervised by the FMS Administrators (6) themselves.

Planning Segmented Trips—Cooperation Between Types of Transportation

To this day, there does not exist a system for analyzing data and satisfying the needs of users to navigate land transportation according to their needs. Any customized or personalized transportation existing or offered today relates only to public transportation as defined by state regulations. In the present invention, the passenger expresses and determine his/her preferences how and when the transportation should be for every segment of the trip made on land, sea and air, departure and arrival locations/points and desired times of departure and arrival. Accordingly, a passenger wishing to make a multi-segment trip may access the central database (4) of the present invention allowing him/her to plan his/her travel from first pick up to last drop offs.

In view of the above, the TIS (1) reflects thinking "outside the box" regarding cooperation between land, aerial and marine transportation. Currently, these types of transportation are managed separately without any global system that joins them together.

Figure 7:
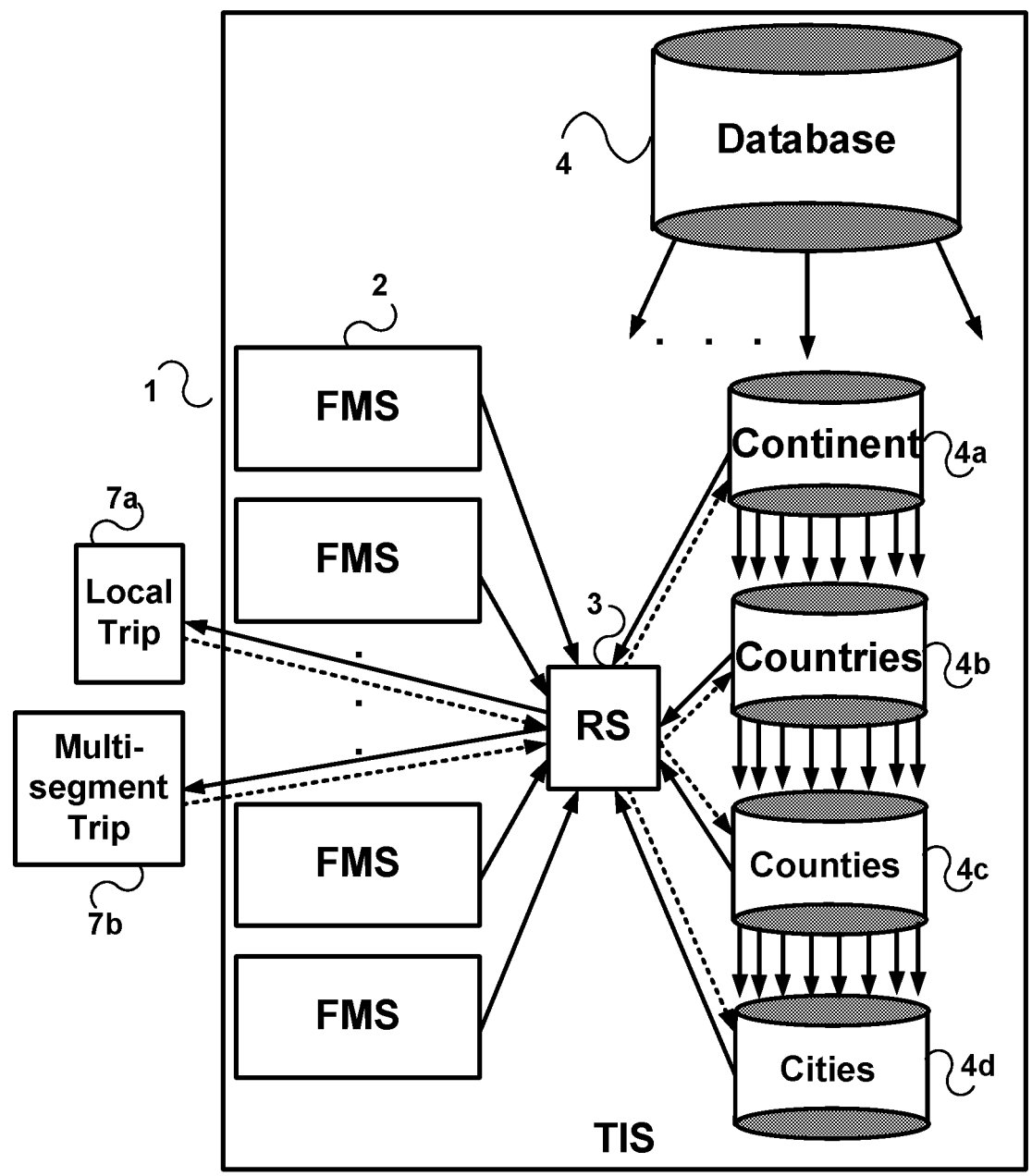
FIG. 7 schematically illustrates different options for creating local or multi-section trip based on geographic data available on the database of the integrated system of the present invention.
Figure 8:
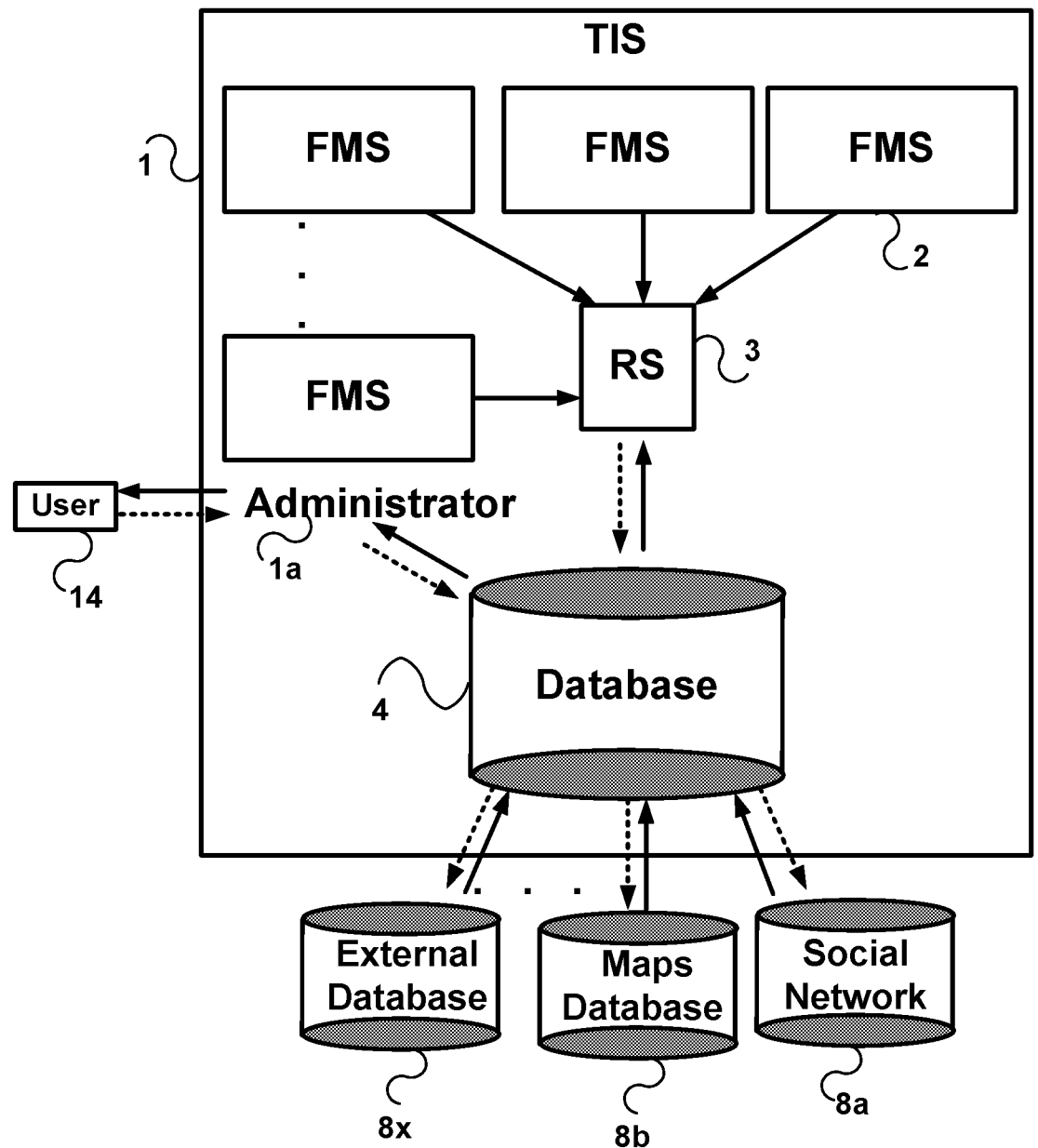
FIG. 8 schematically illustrates communication of information from external databases and to users of the integrated system of the present invention.

FIG. 7 schematically illustrates how such multi-segment trip (7b) can be planned. A passenger sends a request to the RS module (3) regarding trans-continent, country, city and so forth trip. The RS module (3) interrogates geographically categorized sub-databases (4a-4d) of the main database (4) or the database (4) interrogates external databases (8x) as shown in FIG. 8. The RS module (3) identifies intermediate locations between departure and destination fed by the passenger and creates possible routes upon retrieving information regarding possible transportation service providers operating on each location. The RS module (3) retrieves also additional data relating to every particular route such as type of transportation, fees, time travel, hours, intermediate departure and destination, company name, available seats and so on. Then the RS module (3) displays possible package routes to the passenger for his/her choice. Alternatively, the passenger may submit a more detailed request regarding his/her preferences for the trip in response to a questionnaire provided by the RS module (3). The RS module (3) will then submit a more restricted interrogation request to the databases (4a-d and 8x) and return with the resulting routes to the passenger. The FMSs (2) continuously update the RS module (3) on their available rides, and the RS module (3) cross-references them with the planned routes.

The same procedure applies to any possible trip even at the single-segment local level (7a). A passenger requesting to make a trip, for example, from town A to town B, may be presented with several routes. Another option is for sharing ride with another passenger making a request, for example, from town C to town B. The RS module (3) then cross-references the two requests and generates a match, namely a route that combines the two requests of the two passengers.

Thus, the RS module (3) may render ride sharing more efficient to FMSs (2) by joining several requests in a single trip, thereby saving costs and increasing profits for the fleet companies. This applies also to shipping cargo and rides mixing passengers and cargo as long as the route contains intermediate and end points of departure and arrival.

To make such planning more efficient, the TIS (1) synchronizes with publication transportation systems and/or applications and websites that manage and provide information on public transportation. However, the communication between the systems is bidirectional with public transportation that adapts itself to users and passengers. The TIS (1) may also interface directly with other main systems of transportation without intermediating systems between. For example, a multi-segment travel from a departure location in one country to a destination location in another country will be monitored in its entirety by the TIS (1) collecting information from the public transportation used in the local segments in both countries and the international segment.

Such trip planning enabled by the TIS (1) also benefits in reducing the number of vehicles on the roads and as a result also energy consumption and air pollution.

As appreciated from the description above, the TIS (1) essentially provides an open platform for communication between users and other platforms of different functionalities. The TIS (1) is configured to connect with such platforms that provide services interfacing with services of the TIS (1) through ERP (Enterprise Resource Planning) configuration, where the connection between the TIS (1) and these platforms enables the integration of TIS (1) with the platforms in a unified integrated system.

Accordingly, The TIS (1) makes its resources accessible to any user, individual, commercial or system, and therefore serves in this respect as mediator between needs and services. Accordingly, the TIS (1) may connect with other platforms and allow them access to its database and functionalities. Such access may be filtered or allowed only for parties acquiring appropriate clearance for certain classified information. Therefore, the TIS (1) applies security and authentication protocols adaptable for every user accessing it according to the user type of relation with the TIS (1), i.e., consumer, service provider, state authority, research organization, colleagues and so on.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. An integrated transportation management system, comprising:
   at least one fleet management system (FMS);
   at least one ride sharing system (RS);
   a database, and
   a transportation management system administrator including a computer, the computer is configured to:
   supervise and mediate bilateral communication between the FMS and RS upon uploading transportation service offers through the RS module for transporting passengers and cargo,
   mediate bilateral communication between platforms providing transportation services and platforms providing sharing of social connections and information databases;
   provide free access, creation and registration of fleet management systems for entities wishing to offer ride sharing services;
   the transportation management system (TMS) is further configured to:
   receive, analyze and filter data from at least one FMS databases to selectively provide information to users of the at least one RS;
   apply filtering protocols between users and the at least one FMS, for communicating information related to execution of transportation services, restrict access to unauthorized parties; and
   enable direct multi-directional communication between users of the at least one RS and users of the at least one FMS and supporting or supplementing systems,
   wherein, the at least one RS is configured to upload and transmit transportation service requests submitted by the users to the at least one FMS through the TMS;
   the at least one FMS is configured to transmit transportation service offers to the at least one RS;
   the at least one RS is configured to:
   receive the transportation service offers from the at least one FMS and communicate the offers to the users of the at least one RS;
   receive from the users elected transportation service offers and communicate the elected transportation service offers to the at least one FMS;
   generate possible routes between user's departure and destination locations, said routes including intermediate departure and destination locations determined based on retrieved operating location information of transportation service providers;
   retrieve data regarding transportation, fees, travel time, and the intermediate departure and destination locations, and display available options to the users;
   charge the users for the elected transportation service offers, execute payment and distribute the payment for the elected transportation offers to the at least one FMS that extended those offers for execution of transportation services requested by users;
   and wherein the TMS is further configured to:
   store transportation service, route and user data in the database;
   cross-update the FMS and RS after completion of each transportation service; and
   provide an access to the database to government authorities and authorized entities.

2. The transportation management system according to claim 1, wherein the transportation management system is further configured to provide bilateral communications between vehicles of the at least one FMS and vehicles of external systems.

3. The transportation management system according to claim 2, wherein communication with the vehicles is conducted via equipment installed in the vehicles.

4. The transportation management system according to claim 2, further configured to provide communication with the vehicles by one or more of GPS, satellite and wireless mobile phones.

5. The transportation management system according to claim 2, wherein communication with the vehicles is real-time communication.

6. The transportation management system according to claim 2, wherein the at least one FMS and external systems include administrators, and wherein the administrators are configured to be in communication with the vehicles.

7. The transportation management system according to claim 2, wherein the transportation management system is further configured to enable communication between a plurality of FMSs, wherein communication facilitates cooperation between said plurality of FMSs.

8. The transportation management system according to claim 1, wherein the at least one FMS is a mirror-FMS (M-FMS), and wherein the M-FMS is configured to be in communication with the at least one FMS outside the transportation management system, retrieve ride offers from the at least one FMS and transmit the ride offers to the at least one RS.

9. The transportation management system according to claim 1, wherein the transportation management system is further configured to allow vehicle owners to register a FMS on the transportation management system.

10. The transportation management system according to claim 1, further configured to enable communication between passengers for forming shared ride negotiated through the at least one RS.

11. The transportation management system according to claim 1, further comprising filters configured to limit access to and sharing of information by unauthorized users.

12. The transportation management system according to claim 1, wherein the database is configured to store accumulated data related to transportation activities communicated and executed through the transportation management system; communicate with external databases to retrieve information required for execution of transportation activities; and provide data accumulated to users of the transportation management system, and wherein access to the database enables receiving information on regional, national, continental and global transportation in different languages.

13. The transportation management system according to claim 12, further comprising data analysis functionalities for analyzing data in the database according to selected parameters in response to requests issued by the users.

14. The transportation management system according to claim 1, wherein the at least one RS is configured to provide alternative transportation trips in response to requests for transportation service offers submitted by users to the at least one RS modules, and wherein the transportation trips comprise data relating to trip route, intermediate points of stop, time length, estimated times of departure and arrival, type of transportation, transportation service providers and fees.

15. The transportation management system according to claim 14, wherein the trip route is a segmented trip route.

16. The transportation management system according to claim 15, wherein the trip route is an intercontinental, continental, country, or city trip route.

17. The transportation management system according to claim 14, wherein the trip route is a local trip route.

18. The transportation management system according to claim 1, wherein execution of transportation services requested by the users comprises receiving identification of passengers boarding the vehicles and sending the identification to the administrator.

19. The transportation management system according to claim 18, wherein identification is carried out by facial identification, radio-frequency identification, a GPS or satellite locator built in wireless devices of the passengers.

20. The transportation management system according to claim 19, wherein the facial identification is conducted with a camera of a smartphone or with a camera installed in the vehicle.

21. The transportation management system according to claim 19, wherein the wireless devices of the passengers are smartphones.

22. The transportation management system according to claim 1, wherein the payment execution, distribution and transmittal for transportation activities comprises: recording passengers boarding the vehicles; recording destination and departure of trips ordered by the passengers; calculating fees for the trips; collecting fees; recording drop-off point of the passengers and distributing payment received from the passengers between the at least one FMS, the administrator and vehicle drivers.

23. The transportation management system according to claim 22, wherein payment execution, distribution and transmittal for transportation activities further comprises: recording extended destination of passengers not dropping-off of the vehicles; re-calculating supplemental fees for additional sections of extended trips; collecting supplemental fees; and distributing payment of supplemental fees between the at least one FMS, the administrator and the vehicle drivers.

24. The transportation management system according to claim 22, wherein the payment is made at arrival or departure or destination.

25. The transportation management system according to claim 22, wherein the payment is made by online transfer, credit card charging, virtual money transfer or cash.

26. The transportation management system according to claim 22, wherein the payment is registered by the administrator.

27. The transportation management system according to claim 22, wherein the payment execution, distribution and transmittal are transparent to an administrator of the FMS, the administrator of the transportation management system, and to the vehicle driver.

28. The transportation management system according to claim 1, wherein the at least one RS is configured to upload transportation requests submitted by users in an auction, transmit the transportation requests to a plurality of FMSs, receive transportation offers for the transportation requests from the plurality of FMSs, display the transportation offers to the users and communicate transportation offers elected by the users to the FMS extending the transportation offers.

29. The transportation management system according to claim 1, wherein the transportation offers comprise cargo shipping, and wherein the cargo is tracked by customized ID (CID) provided by a sender, and recorded by the administrator of the transportation management system, and the at least one FMS.

30. The transportation management system according to claim 29, wherein the transportation offers comprise the cargo shipping, and wherein the cargo is tracked by a GPS tracking chip or a barcode.

31. The transportation management system according to claim 1, wherein the administrator enables and controls communication and cooperation between a plurality of FMSs operating on the transportation management system for submitting transportation service offers.

32. The transportation management system according to claim 1, further configured to apply security and authentication protocols for the users, locate vehicles in cases of car theft, generate responses in case of car accidents, monitor driver behavior, rest and work hours, and control loading of luggage, cargo, merchandize and goods.

33. The transportation management system according to claim 1, wherein the at least one FMS is selected from cargo companies, shipping companies, private and public bus companies, public and private transportation companies, companies maintaining field workers, salesmen, service personnel, workers provided with transportation to, from and during work, companies maintaining field workers for different tasks using company-dedicated service vehicles, cab drivers, car service drivers, cooperative companies with a plurality of users sharing several vehicles, private and public marine vehicles for cargo shipping and people transportation, rental marine vehicles, aerial vehicles for cargo and people, rental and leasing aerial vehicles, industries and factories requiring distribution lines for their goods, industries and factories managing distribution fleet of vehicles for their goods, courier companies for post office and packages, logistic companies and individuals owning private vehicles, which they lend for ride sharing and cargo shipping.

34. The transportation management system according to claim 1, wherein the transportation management system is configured to connect with platforms providing services interfacing with transportation management system services through ERP (Enterprise Resource Planning) configuration in a unified integrated system.

\* \* \* \* \*